United States Patent Office 3,488,298
Patented Jan. 6, 1970

3,488,298
POLYESTER SCRAP RECOVERY PROCESSES
Kenneth T. Barkey, Edwin B. Lefferts, and Douglas C. May, Rochester, N.Y., assignors to Eastman Kodak Company, Rochester, N.Y., a corporation of New Jersey
No Drawing. Filed Dec. 1, 1966, Ser. No. 598,153
Int. Cl. C08g 53/22
U.S. Cl. 260—2.3      10 Claims

ABSTRACT OF THE DISCLOSURE

In processes for recovering polyester scrap for reuse, which processes involve initially degrading the polyester with a lower alkyl alcohol and subsequently recovering glycol, dicarboxylic diester, and alcohol from the resulting reaction mixture by distillation, it has been discovered that substantialy higher yields of desired components result when a small amount of a phosphorus-containing material that is capable of reacting with the ester exchange catalyst(s) in the scrap is blended into the reaction mixture at the end of the alcoholysis step of the processes.

---

This invention relates to the preparation of linear superpolyesters of glycols and dicarboxylic acids having a molecular weight of at least about 15,000 and ranging upward to 100,000 or more. More particularly, this invention relates to an improved process for the recovery of reactants from the scrap resulting from the utilization of such polyesters in the formation of films, fibers, etc.

The preparation of polyesters by esterification or ester exchange and condensation is well known. U.S. Patent 2,465,319 and many subsequently issued patents such as U.S. 2,727,881 describe such processes in great detail. A common feature of all such processes is that they begin with a lower dialkyl ester of a bifunctional dicarboxylic acid which is condensed with a (bifunctional) glycol, the glycol usually being used as such although it can be used in the form of lower alkanoic acid ester thereof, such esters being equivalents of the glycol.

It is known that the preparation of polyesters from a glycol and a dibasic acid as described above is a reversible, equilibrium reaction which may be exemplified as follows:

(I)  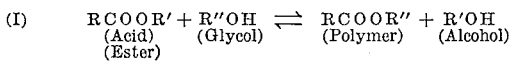

wherein, for poly(ethyleneterephthalate), R represents $CH_3OOC$-phenyl, $HOCH_2CH_2OOC$-phenyl or

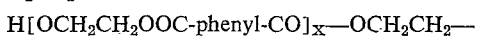

R' represents —$CH_3$ or —$CH_2CH_2OH$ and R" represents $HOCH_2CH_2$— or

H[$OCH_2CH_2OOC$-phenyl-CO]$_x$—$OCH_2CH_2$—

At equilibrium, the amount of each of the reactants in Equation I, above, depends upon the concentrations of the reactants present. Increased quantities of alcohol give increased concentrations of dibasic acid ester (e.g., dimethylterephthalate) as the molecular weight of the polymer is reduced toward unit degree of polymerization. The resulting glycol formed from the polymer also equilibrates to leave monomer (e.g., bis-β-hydroxyethyl terephthalate) and lower amounts of dimer, trimer, etc., in the equilibrium mixture. The ratio of products and reactants is defined by an equilibrium constant, which varies somewhat with temperature. Catalysts affect rates of reaction without appreciable change of the equilibrium constant.

When polyesters are subjected to the various manufacturing processes, e.g., film and fiber making, molding of shaped objects, etc., scrap is necessarily formed as a by-product. It has been the practice in the past to subject such polyester scrap to conditions whereby the polyester equilibrium reaction (Equation I) is reversed and the polyester constituents recovered so that they may be used again. For example, the usual practice has been to react the polyester scrap to equilibrium with a suitable catalyst and a lower alcohol (e.g., methanol, ethanol, propanol, and the like, containing from 1–4 carbon atoms) at elevated temperatures and pressures. The dibasic acid ester (e.g., DMT) was then recovered by a rather complex and time consuming operation which requires filtration to separate constituents (e.g., glycol, alcohol, catalyst) from the DMT and then washing the crude alcohol-wet DMT cake with alcohol. This filtration step removed most of the catalyst, glycol, etc. and the crude DMT cake was then atmospherically distilled to remove alcohol and finally refined by vacuum distillation to give a pure DMT which was usuable in the manufacturing operation. The filtrate (i.e., glycol, catalyst, monomer, etc.) was also separated by distillation and reused.

Continuing problems in such scrap recovery processes, however, have been (a) the necessity for the filtration operation and (b) the action of the catalyst in the scrap. The catalysts were known to retain their activity even after being processed into usable products and their presence in the scrap with ethylene glycol from the recovery reaction and the additional catalyst added during the recovery operation allowed the reversal of the equilibrium reaction. That is, while the process of recovering, for example, DMT from the scrap was being attempted, the active catalyst pushed the equilibrium toward production of polyester. Accordingly, in the past, most recovery processes were not practical due to the low yields of recoverable polyester "raw" materials (such as DMT and glycol). It would therefore be highly advantageous if the reaction mixture (i.e., scrap reacted with catalyst and alcohol) could be separated into its various components directly and thus avoid handling of two fractions, DMT and filtrates. Normally, however, if the filtration and washing steps are omitted from conventional scrap recovery processes, the polymerization reaction reoccurs to a considerable extent, thus reducing the DMT yield.

Accordingly, it is an object of this invention to provide an improved process for recovering starting material from polyester scrap.

A still further object of the invention is to provide an improved process for recovering polyester starting materials from polyester scrap which eliminates the necessity for washing and filtration steps.

Another object of the invention is to provide a method for deactivating catalysts in polyester scrap material.

The above objects, and other objects which will become apparent to those skilled in the art, are attained by the practice of this invention which, briefly, comprises (a) Treating the polyester scrap mixture with at least about 90% of the amount of a phosphorus-containing compound, based on the total ester-exchange catalyst concentration, necessary to deactivate the ester-exchange catalysts in the mixture and thereby minimize the repolymerization reaction and (b) Then heating the treated mixture directly to remove alcohol, water, glycols, etc., from the DMT.

According to a preferred embodiment of this invention there is provided an improved process for recovering dimethyl terephthalate and ethylene glycol from poly(ethyleneterephthalate) scrap which comprises (1) forming a mixture comprising poly(ethylenetrephthalate), catalyst and methanol (2) heating said mixture to approach equilibrium in accordance with Equation I above, (3) treating the partially hydrolyzed mixture with a stoichiometric excess of a phosphorus-containing compound, based on the total ester interchange catalyst concentration, to deactivate the ester exchange catalyst and (4) heating the treated mixture to fractionate the constituents thereof and recover methanol, ethylene glycol, and dimethyl terephthalate of sufficient purity to be directly utilizable in polyester manufacture.

The phosphorus-containing compound with which the equilibrated reaction mixture is treated in accordance with the invention is one of phosphoric acid, phosphorous acid or esters thereof, among others, includes aryl phosphites or phosphates, alkyl phosphites or phosphates, cycloalkyl phosphites or phosphates, aralkyl phosphite or phosphates and the like. Examples of such phosphorus compounds include triphenyl phosphite, tricresyl phosphite, dibutylphenyl phosphite, phenyl ethyl phosphite, trimethyl phosphite, triethyl phosphite, trioctyl phosphite, diamyl phosphite, monoamyl phosphite, diphenoxyethyl phosphite, dicyclohexyl phosphite, tricapryl phosphite, tridiisobutylphenyl phosphite, triphenylethyl phosphite, tri-diisobutylphenoxyethyl phosphite and the like. Similar by substituted phosphate compounds are also examples. As set forth hereinabove, the amount of added phosphorus compound is not critical so long as a sufficient amount is added to effectively deactivate at least about 80% of the catalyst. Preferably the phosphorus compound is added in stoichiometric amounts or greater, said amount being based on the total catalyst concentration in the scrap being treated.

The catalysts which may be used in the preparation of polyesters, such as described above, include organic and inorganic compounds of metals such as titanium, manganese, antimony, zinc, tin, lead, calcium, cobalt, lithium, combinations thereof, etc., heretofore utilized by those skilled in the art. The prior art, for example, discloses a great number of such catalysts, some of which are described in patents such as U.S. 2,465,319, U.S. 2,720,502, U.S. 2,727,881 and others. Specific catalysts heretofore known and which may be utilized include tetraisopropyl titanate, titanium dioxide, zinc acetate, zinc acetyl acetonate, lead oxide, calcium oxide, lithium ethoxide, antimony trioxide, manganese acetate and the like. Generally, the acetates, chlorides, nitrates, sulfates, oxides and alkoxides of one or more of the metals zinc, manganese, tin, lead, titanium, antimony, cobalt and lithium are preferred. For example, the catalyst system of zinc acetate and tetraisopropyl titanate or antimony trioxide is well-suited to attain the desired reaction activity. The catalyst is generally utilized in a concentration of from about 0.002 percent by weight of the reactants being condensed. Higher or lower percentages can also be employed.

Generally from about 0.001 percent to about 0.05 percent catalyst can be advantageously employed.

Certain catalysts influence the ester interchange portion of those polyester processes involving ester interchange much more strongly than they influence the polycondensation portion. Conversely, the reverse is true of other catalyts. As a result, certain catalysts have become known in the polyester processing art as "ester exchange catalysts." These are exemplified by compounds containing divalent metals such as zinc, manganese, cobalt, cadmium, calcium, mangesium and the like, and also by catalytic compounds that contain titanium. Scrap recovery process temperatures are usually in the range corresponding to the ester exchange reaction.

Equilibrium studies have shown that a theoretical optimum yield of 90 percent aromatic diester is predicted when one part of scrap is reacted with 2.5 parts by weight of lower alkyl alcohol and suitable catalyst. The remainder is monomer and low molecular weight fractions. The 90 percent yield can thus serve as a basis for showing the effectiveness of the process of the invention as illustrated by the following examples.

In these examples, all parts given are by weight, unless otherwise specified.

EXAMPLE I

A mixture of 246 parts of small chips of poly(ethyleneterephthalate) scrap containing 320 p.p.m. of zinc (originally added as zinc acetate during the manuafcture of the polymer) and 230 p.p.m. of antimony (originally added as antimony trioxide) and 615 parts of methanol are heated under pressure in a conventional glass lined chemical reactor at a temperature of 200° C. for four hours by which time the polymer has hydrolyzed to form a mixture which is approximately an equilibrium mixture and contains DMT, ethylene glycol, methanol, some monomer, and a small amount of dimer and trimer. The amount of DMT in this mixture is about 90 percent of the amount in the original scrap polyester.

The resulting partially alcoholyzed reaction mixture is then cooled to about 50° C. Into it are then blended 15 parts of triphenyl phosphite. This is more than enough phosphorus-containing material, thereoretically, to combine with all of the zinc and antimony in the reaction mixture. The vapors are then vented to a condensing system and enough heat is applied to the mixture to distill from the mixture methanol, ethylene glycol, and DMT (under reduced pressures varying from 15 mm. Hg to about 70 mm. Hg and temperatures ranging up to about 210° C.) Data showing the yields of the various recovered materials (as compared with the amounts theoretically obtainable, based on the amounts of respective materials in the mixture at "equilibrium") is tabulated following the description of Example 2, below.

Example 2 is illustrative of a conventional process for recovering the various components from polyester scrap, and represents a basis (by comparing the results of Example 1 with those of Example 2) for the appreciation of the type of benefits that can result from practicing the present invention.

EXAMPLE 2

The process of Example 1, above, is repeated, except that no phosphorus-containing compound is utilized. Results of the final separation and recovery of methanol, DMT, and ethylene glycol are tabulated below:

TABLE I

| Material | Example 1 data | Theory [1] | Example 2 data |
|---|---|---|---|
| Methanol | 529 | 542 | 532 |
| Glycol plus DMT | 313 | 294 | 142 |
| Dregs | 37 | 40 | 202 |

[1] Based on equilibrium constant and 90 percent yields of DMT and EG.

From the foregoing examples, it can be seen that by practicing the present processes, substantially larger proportions of the desired materials can be recovered for reuse if desired, as compared with the amounts of materails recoverable by conventional hydrolysis and distillation means. As it was indicated hereinbefore, these advantages are accomplished by (a) initially either taking advantage of the catalyst residues that are usually present in polyester scrap or adding to the reaction mixture one or more catalytic materials in order to permit the initial very rapid alcoholysis of the polymer (the very high rate being almost entirely due to the presence of the catalyst), until the resulting reaction mixture approaches equilibrium, and (b) then effectively blocking the catalyst (especially the "ester exchange" catalyst) in order to prevent the ester exchange and repolymerization reactions that would otherwise occur during the distillation step of these processes (as methanol and ethylene glycol are removed from the system).

While optimum yields and other results can be obtained when the phosphorus-containing material is added to the mixture when the partially hydrolyzed reaction mixture is at about "equilibrium," significant benefits can nevertheless be obtained by blending the effective phosphorus-containing material into the partially alcoholyzed reaction mixture at any time after a significant amount of DMT has been formed in the reaction mixture.

Preferably, the effective phosphorus-containing material should be blended into the partially alcoholyzed reaction mixture after at least half of the scrap has been at least partially ester exchanged (alcoholyzed).

Although the invention has been described in considerable detail with reference to certain specific embodiments thereof, it will be understood that variations and modifications can be effected without departing from the spirit and scope of the invention as set forth in the specification and defined in the appended claims. For example, it should be noted that, while the foregoing specific working examples have been limited to the application of the present invention toward the manufacture of poly(ethyleneterephthalate), the invention is equally applicable to the manufacture of any of the polyester products encompassed by Equation I, above.

What is claimed is:

1. In a process for converting polyester scrap into its individual chemical components, which process comprises the steps of
   (1) forming an initial mixture of said scrap, a lower alcohol and at least one ester interchange catalyst;
   (2) heating said initial mixture until at least part of said scrap has been alcoholyzed or ester exchanged, to thereby form a partially alcoholyzed reaction mixture;
   (3) in a fractionating step, heating said partially alcoholyzed reaction mixture to thereby fractionate at least some of its constituents; and
   (4) recovering the fractionated constituents; the improvement which comprises blending into said partially alcoholyzed reaction mixture prior to said fractionating step an amount of one or more phosphorus-containing compounds selected from the group consisting of phosphoric acid, phosphorus acid, phosphate esters and phosphite esters; said amount being sufficient to deactivate at least about 80 percent of said ester interchange catalyst.

2. An improved process as in claim 1, wherein said polyester is poly(ethyleneterephthalate).

3. An improved process as in claim 2, wherein said lower alcohol is methanol and said initial mixture also contains zinc and antimony catalysts.

4. An improved process as in claim 2, wherein said phosphorus-containing compound is either a phosphite ester or a phosphate ester.

5. An improved process as in claim 4, wherein said phosphorus-containing compound is selected from the group consisting of aryl phosphates, aryl phosphites, alkyl phosphates, alkyl phosphites, cycloalkyl phosphates, cycloalkyl phosphites, aralkyl phosphates, and arylkyl phosphites.

6. An improved process as in claim 5, wherein said phosphorus-containing compound is triphenyl phosphite.

7. An improved process as in claim 5, wherein said phosphorus-containing compound is triphenyl phosphate.

8. An improved process as in claim 5, wherein said phosphorus-containing compound is phosphorous acid.

9. An improved process as in claim 5, wherein said phosphorus-containing compound is phosphoric acid.

10. An improved process as in claim 1, wherein said amount of said phosphorus-containing compounds is at least a stoichiometric amount.

References Cited

UNITED STATES PATENTS

| | | | |
|---|---|---|---|
| 2,437,046 | 10/1943 | Rothrock et al. | 260—75 |
| 2,623,031 | 12/1952 | Snyder | 260—860 |
| 3,403,115 | 9/1968 | Gruschke et al. | 260—2.3 |
| 3,404,121 | 10/1968 | Barkey | 260—45.7 |

FOREIGN PATENTS

| | | |
|---|---|---|
| 802,921 | 10/1958 | Great Britain. |
| 806,269 | 12/1958 | Great Britain. |

MURRAY TILLMAN, Primary Examiner

M. J. TULLY, Assistant Examiner

U.S. Cl. X.R.

260—75, 77